US009047248B2

(12) United States Patent
Crabtree, Jr.

(10) Patent No.: US 9,047,248 B2
(45) Date of Patent: Jun. 2, 2015

(54) LOGICAL DOMAIN RECOVERY

(71) Applicant: SunGard Availability Services, LP, Wayne, PA (US)

(72) Inventor: Edward A. Crabtree, Jr., Turnersville, NJ (US)

(73) Assignee: Sungard Availability Services, LP, Wayne, PA (US)

( * ) Notice: Subject to any disclaimer, the term of this patent is extended or adjusted under 35 U.S.C. 154(b) by 149 days.

(21) Appl. No.: 13/752,835

(22) Filed: Jan. 29, 2013

(65) Prior Publication Data

US 2014/0215259 A1   Jul. 31, 2014

(51) Int. Cl.
*G06F 11/20*   (2006.01)

(52) U.S. Cl.
CPC ................... *G06F 11/202* (2013.01)

(58) Field of Classification Search
CPC .............. G06F 11/202; G06F 11/1458; G06F 11/1469; G06F 11/1461; G06F 11/1417; G06F 11/1464; H04L 2012/5627; H04L 41/054; H04L 41/0813

See application file for complete search history.

(56) References Cited

U.S. PATENT DOCUMENTS

| 7,389,314 B2 * | 6/2008 | Kulkarni et al. ................. 1/1 |
| 7,430,744 B2 | 9/2008 | Straube et al. |
| 7,533,229 B1 | 5/2009 | Van Rietschote |
| 7,539,899 B1 | 5/2009 | Wang |
| 7,555,674 B1 | 6/2009 | Wang |
| 7,675,850 B2 | 3/2010 | Wang et al. |
| 7,779,305 B2 * | 8/2010 | Zimmer et al. ............ 714/38.13 |
| 8,108,429 B2 | 1/2012 | Sim-Tang et al. |
| 8,156,373 B2 * | 4/2012 | Zheng et al. .................... 714/15 |
| 8,234,515 B2 * | 7/2012 | Collier et al. ...................... 714/1 |
| 8,271,655 B2 | 9/2012 | Dawson et al. |
| 8,332,689 B2 * | 12/2012 | Timashev et al. ............... 714/15 |
| 8,566,640 B2 * | 10/2013 | Timashev et al. ............... 714/15 |
| 8,719,631 B2 * | 5/2014 | Tsirkin et al. ................... 714/23 |
| 2008/0183776 A1 * | 7/2008 | Kulkarni et al. ............. 707/204 |

(Continued)

FOREIGN PATENT DOCUMENTS

WO   WO 2011/069665 A1   6/2011

OTHER PUBLICATIONS

CloudReplicatre Datasheet, "CloudReplace for Salesforce—Unleash your Salesforce Data" Jitterbit, Inc., 2010, 2 pages.
Logical Domains 1.2 Reference Manual, docs.oracle.com/cd/E19227-01/820-7255/ldm-1m/index.html, SunOS 5.10, Jun. 2009, 34 pages.

(Continued)

*Primary Examiner* — Nadeem Iqbal
(74) *Attorney, Agent, or Firm* — Cesari and McKenna LLP

(57) ABSTRACT

Recovering logical domain processes from a virtual production environment to a recovery environment by building recovery automation scripts. The process, partially automated and partially guided by an administrative user, captures logic necessary for orderly recovery, but also permits the user to specify certain configuration information for the recovered logical domains. A first step before building recovery script(s) is to execute a capture script on the production environment to retrieve configuration information for the production logical domains. Based on this captured output, a recovery script builder then starts to build one or more recovery script(s). To account for unavoidable inconsistencies between the production and recovery environments, the user is guided through a deterministic process of providing additional information, such as different resource mappings, so that the script builder may further address such differences.

20 Claims, 22 Drawing Sheets

(56) References Cited

U.S. PATENT DOCUMENTS

| | | | |
|---|---|---|---|
| 2008/0276123 A1* | 11/2008 | Sudhakar et al. | 714/6 |
| 2009/0276771 A1 | 11/2009 | Nickolov et al. | |
| 2011/0173405 A1 | 7/2011 | Grabarnik et al. | |
| 2012/0017114 A1* | 1/2012 | Timashev et al. | 714/15 |
| 2012/0066670 A1 | 3/2012 | McCarthy et al. | |
| 2012/0246315 A1 | 9/2012 | Kagan | |
| 2014/0122926 A1* | 5/2014 | Bartholomy et al. | 714/15 |

OTHER PUBLICATIONS

Kanaracus, Chris, "Salesforce.com gets Amazon cloud replicant tool" IDG News Service, http://www.itworld.com/software/129294/salesforcecom-getes-amazon-cloud-replication-tool, Dec. 1, 2010, 5 pages.

U.S. Appl. No. 13/422,091, filed Mar. 16, 2012 by Chandra Reddy entitled Discovering Boot Order Sequence of Servers Belonging to an Application, 32 pages.

* cited by examiner

```
=================================================
|| SunGard Logical Domain Recovery MENU ||
=================================================
1. [ ] Customer File and System Package Verification
2. [ ] Create Disk List for LDOM Use
3. [ ] Control/Service Domain Creation
4. [ ] Logical Domain Creation
5. Options 0. Go Back or press "Enter" to Main Menu
Enter option:
```

Figure 3

```
=================================================
||     SunGard Logical Domain Recovery     ||
=================================================
 File and System Package Verification Menu
=================================================
 1. [ ] Verify Recovery Files have been Restored
 2. [ ] Verify Oracle VM / Logical Domain Packages
 3. [ ] Verify Network Configuration 0. Go Back or press "Enter" to Main Menu
Enter option:
```

Figure 4

```
================================================
||     SunGard Logical Domain Recovery       ||
================================================

File Verification
================================================

Production file count is:     15
LDOM file count is:            3
Control domain  count is:     12
Found primary.services
Found primary.constraints
primary.constraints.new
Found primary.ldmlist
Found ifconfig.out
Found hosts

###########################################################################
Production Directory /var/tmp/ldmcfg/output/ldmconfigs-latest exists and contains     15 files Content Listing is :

total 60
drwxr-xr-x   2 root      root         1536 Oct 30 12:39 .
drwxr-xr-x   3 root      root          512 Oct 24 11:49 ..
-rw-r--r--   1 root      root            9 Oct 18 17:47 hostname.igb0
-rw-r--r--   1 root      root           13 Oct 18 17:47 hostname.vnet0
-rw-r--r--   1 root      root           14 Oct 18 17:47 hostname.vsw1
-rw-r--r--   1 root      root           14 Oct 18 17:47 hostname.vsw2
```

Figure 5

```
================================================
||     SunGard Logical Domain Recovery       ||
================================================

File and System Package Verification Menu
================================================

1. [x] Verify Recovery Files have been Restored

2. [ ] Verify Oracle VM / Logical Domain Packages

3. [ ] Verify Network Configuration

0. Go Back or press "Enter" to Main Menu
Enter option:
```

Figure 6

```
================================================
||    SunGard Logical Domain Recovery      ||
================================================
 Package Verification
================================================

Package Found running version 2.2.0.0,REV=2012.04.19.14.10
Verifying services are enabled
Oracle VM (ldmd) services are running ATTENTION:
Virtual Network Terminal Services Daemon (vntsd) is NOT running.
This service must be enabled after the control domain has been configured
and is running in order to properly connect to guest ldoms To enable, run "svcadm enable vntsd".

The state of ldm services are as follows:
STATE          STIME    FMRI
online         11:56:01 svc:/ldoms/ldmd:default
STATE          STIME    FMRI
online         11:55:38 svc:/network/loopback:default
online         11:55:51 svc:/platform/sun4v/drd:default
online         11:55:52 svc:/system/filesystem/local:default
online         11:55:58 svc:/ldoms/agents:default 0. Go Back or press "Enter" to Main Menu
Enter option:
```

Figure 7

```
================================================
||    SunGard Logical Domain Recovery      ||
================================================
 File and System Package Verification Menu
================================================

1. [x] Verify Recovery Files have been Restored

2. [x] Verify Oracle VM / Logical Domain Packages

3. [ ] Verify Network Configuration

0. Go Back or press "Enter" to Main Menu
Enter option:
```

Figure 8

```
================================================
||    SunGard Logical Domain Recovery        ||
================================================

Map Production Networks to Recovery
================================================

LOCATION      DEV      IP_ADDR            NETMASK           MAPPED_TO_DEVICE
PRODUCTION    igb0     172.16.90.64       255.255.255.0
PRODUCTION    vsw1     10.133.143.112     255.255.255.0
PRODUCTION    vsw2     10.162.1.69        255.255.192.0
PRODUCTION    vnet0    172.16.70.22       255.255.255.0

RECOVERY      igb0     172.10.10.22       255.255.0.0
RECOVERY      igb1     10.60.10.118       255.255.255.0
RECOVERY      igb2     192.168.10.1       255.255.255.0
RECOVERY      igb3     10.122.223.12      255.255.255.0

0. Go Back or press "Enter" to Main Menu
Enter option:
```

Figure 9

```
================================================
||    SunGard Logical Domain Recovery        ||
================================================

File and System Package Verification Menu
================================================

1. [x] Verify Recovery Files have been Restored

2. [x] Verify Oracle VM / Logical Domain Packages

3. [x] Verify Network Configuration

0. Go Back or press "Enter" to Main Menu
Enter option:
```

Figure 10

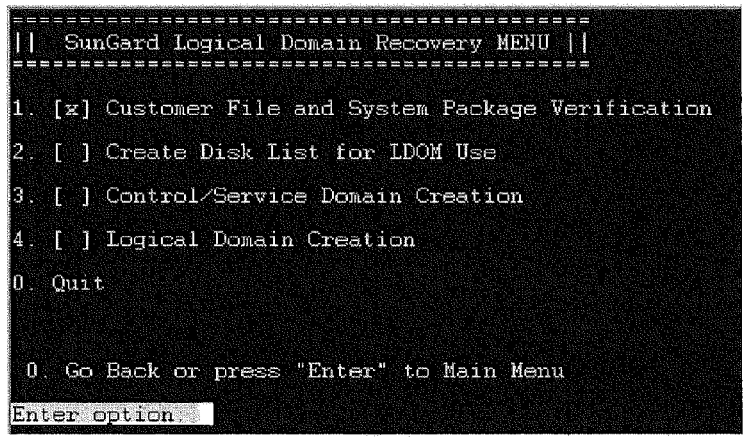

Figure 11

```
=================================================
||    SunGard Logical Domain Recovery    ||
=================================================

Create Disk List for LDOMs
=================================================

Creating a list of available disk for mapping.

The following devices are excluded from disk mapping
Be advised, this does not account for devices already mapped to LDOMs Device                     Description
======================     =======================================
c1t0d0s2                   CDReader
c3t7d0s2                   DVDReader/Writer
c0t5000C500432530AFd0      Configured as part of a ZPOOL
c0t5000C50042FA8903d0      Configured with UFS Mounted Filesystems Available Storage for Mapping
=======================    =======================    =======================
c2t500507630378D37Dd0s2    c2t500507630378D37Dd10s2   c2t500507630378D37Dd11s2
c2t500507630378D37Dd12s2   c2t500507630378D37Dd13s2   c2t500507630378D37Dd14s2
c2t500507630378D37Dd15s2   c2t500507630378D37Dd16s2   c2t500507630378D37Dd17s2
c2t500507630378D37Dd18s2   c2t500507630378D37Dd19s2   c2t500507630378D37Dd1s2
c2t500507630378D37Dd20s2   c2t500507630378D37Dd21s2   c2t500507630378D37Dd22s2
c2t500507630378D37Dd23s2   c2t500507630378D37Dd24s2   c2t500507630378D37Dd25s2
c2t500507630378D37Dd26s2   c2t500507630378D37Dd27s2   c2t500507630378D37Dd28s2
c2t500507630378D37Dd29s2   c2t500507630378D37Dd2s2    c2t500507630378D37Dd3s2
c2t500507630378D37Dd4s2    c2t500507630378D37Dd5s2    c2t500507630378D37Dd6s2
c2t500507630378D37Dd7s2    c2t500507630378D37Dd8s2    c2t500507630378D37Dd9s2

0. Go Back or press "Enter" to Main Menu
Enter option
```

Figure 12

```
================================================
||  SunGard Logical Domain Recovery MENU  ||
================================================
1. [x] Customer File and System Package Verification
2. [x] Create Disk List for LDOM Use
3. [ ] Control/Service Domain Creation
4. [ ] Logical Domain Creation
0. Quit 0. Go Back or press "Enter" to Main Menu
Enter option:
```

Figure 13

```
================================================
||     SunGard Logical Domain Recovery     ||
================================================
 Control/Service Domain Creation
================================================
 1. [ ] Create Control Domain Services
 2. [ ] Map Network Configuration 0. Go Back or press "Enter" to Main Menu
Enter option:
```

Figure 14

```
==================================================
||      SunGard Logical Domain Recovery        ||
==================================================

Control Domain build based on customer files
==================================================

Adding Default Services to Control Domain

Adding Default Services to Control Domain
Adding Virtual Console Concentrator Service
Configure Virtual CPUs
Configuring Memory
Configure Crypto Unit if it exists The initial build of the control file show as:
#####################################
Control Domain Configuration for t4-2-1
ldm add-vdiskserver primary-vds0 primary
ldm add-vdiskserver primary-vds1 primary
ldm add-vcc port-range=5000-5100 primary-vcc0 primary
ldm set-vcpu 8 primary
ldm set-memory 6G primary
ldm set-mau 1 primary 0. Go Back or press "Enter" to Main Menu Enter option:
```

Figure 15

```
==================================================
||      SunGard Logical Domain Recovery        ||
==================================================

Control/Service Domain Creation
==================================================

1. [x] Create Control Domain Services

2. [ ] Map Network Configuration

0. Go Back or press "Enter" to Main Menu

Enter option:
```

Figure 16

```
==================================================
||    SunGard Logical Domain Recovery    ||
==================================================

Map Production Netwoks to Recovery
==================================================

LOCATION      DEV        IP_ADDR           NETMASK              MAPPED_TO_DEVICE
PRODUCTION    igb0       172.16.90.64      255.255.255.0
PRODUCTION    vsw1       10.133.143.112    255.255.255.0
PRODUCTION    vsw2       10.162.1.69       255.255.192.0
PRODUCTION    vnet0      172.16.70.22      255.255.255.0

RECOVERY      igb0       172.10.10.22      255.255.0.0
RECOVERY      igb1       10.60.10.118      255.255.255.0
RECOVERY      igb2       192.168.10.1      255.255.255.0
RECOVERY      igb3       10.122.223.12     255.255.255.0

Production Network Interfaces:
  1.[ ] igb0
  2.[ ] vsw1
  3.[ ] vsw2
  4.[ ] vnet0

Recovery Network Interfaces
 21.[ ] igb0
 22.[ ] igb1
 23.[ ] igb2
 24.[ ] igb3
Enter one Production Interface (enter "0" to quit or press RETURN when done):▇
```

Figure 17

```
==================================================
||    SunGard Logical Domain Recovery    ||
==================================================

Map Production Netwoks to Recovery
==================================================

LOCATION      DEV        IP_ADDR           NETMASK              MAPPED_TO_DEVICE
PRODUCTION    igb0       172.16.90.64      255.255.255.0        igb0
PRODUCTION    vsw1       10.133.143.112    255.255.255.0        igb1
PRODUCTION    vsw2       10.162.1.69       255.255.192.0        igb3
PRODUCTION    vnet0      172.16.70.22      255.255.255.0

RECOVERY      igb0       172.10.10.22      255.255.0.0
RECOVERY      igb1       10.60.10.118      255.255.255.0
RECOVERY      igb2       192.168.10.1      255.255.255.0
RECOVERY      igb3       10.122.223.12     255.255.255.0

Production Network Interfaces:
  1.[ ] vnet0

Recovery Network Interfaces
 21.[ ] igb2
Enter one Production Interface (enter "0" to quit or press RETURN when done):▇
```

Figure 18

```
================================================
LOCATION      DEV      IP_ADDR           NETMASK           MAPPED_TO_DEVICE
PRODUCTION    igb0     172.16.90.64      255.255.255.0     igb0
PRODUCTION    vsw1     10.133.143.112    255.255.255.0     igb1
PRODUCTION    vsw2     10.162.1.69       255.255.192.0     igb3
PRODUCTION    vnet0    172.16.70.22      255.255.255.0

RECOVERY      igb0     172.10.10.22      255.255.0.0
RECOVERY      igb1     10.60.10.118      255.255.255.0
RECOVERY      igb2     192.168.10.1      255.255.255.0
RECOVERY      igb3     10.122.223.12     255.255.255.0

Production Network Interfaces:
  1.[x] vnet0

Recovery Network Interfaces
 21.[ ] igb2
Enter the Recovery NIC to be used (enter again to uncheck, press RETURN when done):21

You are mapping vnet0

To Recovery Interface igb2

Moving /etc/hostname.igb2 to /etc/hostname.vnet0

Creating VSWITCH configuration before VNET configuration

Appending
    "ldm add-vsw -q default-vlan-id=1 pvid=1 vid=71,100 net-dev=igb2 id=0 primary-vsw0 primary"
 to /var/tmp/ldmcfg/tmp/control.network
Appending "ldm add-vnet pvid=71 vnet0 primary-vsw0 primary" command to /var/tmp/ldmcfg/tmp/control.network 0. Go Back or press "Enter" to Main Menu
Enter option:
```

Figure 19

```
================================================
||    SunGard Logical Domain Recovery      ||
================================================

Map Production Netwoks to Recovery
================================================

LOCATION      DEV      IP_ADDR           NETMASK           MAPPED_TO_DEVICE
PRODUCTION    igb0     172.16.90.64      255.255.255.0     igb0
PRODUCTION    vsw1     10.133.143.112    255.255.255.0     igb1
PRODUCTION    vsw2     10.162.1.69       255.255.192.0     igb3
PRODUCTION    vnet0    172.16.70.22      255.255.255.0     igb2

RECOVERY      igb0     172.10.10.22      255.255.0.0
RECOVERY      igb1     10.60.10.118      255.255.255.0
RECOVERY      igb2     192.168.10.1      255.255.255.0
RECOVERY      igb3     10.122.223.12     255.255.255.0

Press 0 to return to Control Domain Configuration Menu

0. Go Back or press "Enter" to Main Menu
Enter option:
```

Figure 20

```
=================================================
||     SunGard Logical Domain Recovery      ||
=================================================

Control/Service Domain Creation
=================================================

1. [x] Create Control Domain Services

2. [x] Map Network Configuration

The following task will assemble a Control Domain Script based the prior steps.

3. [x] Assemble Control Domain Script

4. Execute Control Domain Script (you will be prompted for a required reboot)

0. Go Back or press "Enter" to Main Menu
Enter option:
```

Figure 21

```
Checking for files...
/var/tmp/ldmcfg/tmp/control.control found
/var/tmp/ldmcfg/tmp/control.network found
Assembling script....
                                                     vds0
File is assembled.
    File Name: /var/tmp/ldmcfg/scripts/control.sh File contents
##################################
Control Domain Configuration for t4-2-1
ldm add-vdiskserver primary-vds0 primary
ldm add-vdiskserver primary-vds1 primary
ldm add-vcc port-range=5000-5100 primary-vcc0 primary
ldm set-vcpu 8 primary
ldm set-memory 6G primary
ldm set-mau 1 primary
ldm add-vsw -q default-vlan-id=1 pvid=1 net-dev=igb1 id=1 primary-vsw1 primary
ldm add-vsw -q default-vlan-id=1 pvid=1 net-dev=igb3 id=2 primary-vsw2 primary
ldm add-vsw -q default-vlan-id=1 pvid=1 vid=71,100 net-dev=igb2 id=0 primary-vsw0 primary
ldm add-vnet pvid=71 vnet0 primary-vsw0 primary 0. Go Back or press "Enter" to Main Menu
Enter option:
```

Figure 22

```
===========================================
||    SunGard Logical Domain Recovery    ||
===========================================
 Execute Control Domain Script
===========================================

Executing this script requires a reboot.

Reboot now? [n] ▮
```

Figure 23

```
================================================
||     SunGard Logical Domain Recovery      ||
================================================

Execute Control Domain Script
================================================

Reboot now? [n] y

Executing Control Domain Script /var/tmp/ldmcfg/scripts/control.sh

This may take a few minutes, please be patient
```

Figure 24

```
Executing Control Domain Script /var/tmp/ldmcfg/scripts/control.sh

Adding configuration "initial" to the control domain
Inital Configuration found.  Removing this config
Adding configuration.

VCC
    NAME              LDOM              PORT-RANGE
    primary-vcc0      primary           5000-5100

VSW
    NAME              LDOM              MAC                NET-DEV   ID   DEVICE     LINKPROP    DEFAULT-VLAN-ID PVID VID
    MTU    MODE    INTER-VNET-LINK
    primary-vsw1      primary           00:14:4f:fa:26.69 igb1       1    switch@1               1               1
    1500          on
    primary-vsw2      primary           00:14:4f:f9:ba:11 igb3       2    switch@2               1               1
    1500          on
    primary-vsw0      primary           00:14:4f:f9:fe:dd igb2       0    switch@0               1               1
    1500          on VDS
    NAME              LDOM              VOLUME             OPTIONS        MPGROUP     DEVICE
    primary-sls0      primary
    primary-sts0      primary After reboot, ensure that the vntsd service is enabled
by running "svcadm enable vntsd"
```

Figure 25

```
Nov  1 11:20:23 t4-2-1 syslogd: going down on signal 15
t4-2-1:t4-2-1# Nov  1 11:20:23 /usr/lib/snmp/snmpdx: received signal 15
syncing file systems... done
rebooting...
Resetting...

SPARC T4-2, No Keyboard
Copyright (c) 1998, 2014, Oracle and/or its affiliates. All rights reserved.
OpenBoot 4.33.1, 15104 MB memory available, Serial #99966808.
Ethernet address 0:21:28:85:5f:58, Host ID: 85f55f58.

Boot device: /pci@400/pci@2/pci@0/pci@e/scsi@0/disk@w5000cca02532e4a1,0:a  File and args
```

Figure 26

```
=================================================
||   SunGard Logical Domain Recovery MENU      ||
=================================================

1. [ ] Customer File and System Package Verification

2. [ ] Create Disk List for LDOM Use

3. [ ] Control/Service Domain Creation

4. [ ] Logical Domain Creation

5. Options

0. Go Back or press "Enter" to Main Menu
Enter option:
```

Figure 27

```
=================================================
||      SunGard Logical Domain Recovery        ||
=================================================
 Logical Domain Creation
=================================================

1. [ ] Create LDOM Templates based on Production
              * Map LUNs to specific LDOM
              * Map ISO files to specific LDOM 0. Go Back or press "Enter" to Main Menu
Enter option:
```

Figure 28

```
================================================
||    SunGard Logical Domain Recovery      ||
================================================
 ISO file directory for LDOMs
================================================
Enter the directory path for iso files ('q' to quit): /isofiles
Directory does not exist
Enter the directory path for iso files ('q' to quit): /etc There are no iso files listed in this directory
ISO files must have a .iso extension, please update filenames or verify directory Enter the directory path for iso files ('q' to quit): /iso ISO Files found :

file1.iso          file2.iso
```

Figure 29

```
================================================
||    SunGard Logical Domain Recovery      ||
================================================
 Logical Domain List
================================================
Available Ldoms:
   1.[x] ldoma
   2.[x] ldomb
   3.[ ] ldomc
Enter an ldom (press RETURN when done):
```

Figure 30

```
================================================
||    SunGard Logical Domain Recovery      ||
================================================
 Map ISO files to VDS and to LDOM
================================================
Available ISO Files:

1.[x] file1.iso
  2.[ ] file2.iso

Enter an option (enter again to uncheck, press RETURN when done):
```

Figure 31

```
=================================================
||     SunGard Logical Domain Recovery        ||
=================================================

Map ISO files to VDS and to LDOM
=================================================
Available ISO Files:

1.[x] file1.iso
  2.[ ] file2.iso

Enter an option (enter again to uncheck, press RETURN when done):
You selected file1.iso Creating iso script Enter a name for file1.iso iso file as it will appear to the ldoma: ldom OBP: bmrdvd The LDOMISOVDS is set to primary-vds0 ldm add-vdsdev options=ro /iso/file1.iso file1.iso.ldoma@primary-vds0
ldm add-vdisk bmrdvd file1.iso.ldoma@primary-vds0  ldoma Adding Disk to the ldoma ldom After reboot, ensure that the vntsd service is enabled
by running "svcadm enable vntsd"
```

Figure 32

```
=================================================
||     SunGard Logical Domain Recovery        ||
=================================================
         ldoma Disk Assignment
=================================================

Available Disk witin the VDS Service:
   1.[x] c9t0d0s2
   2.[x] c9t10d0s2
   3.[x] c9t11d0s2
   4.[x] c9t12d0s2
   5.[ ] c9t13d0s2
   6.[ ] c9t14d0s2
   7.[ ] c9t15d0s2
   8.[ ] c9t1d0s2
   9.[ ] c9t2d0s2
  10.[ ] c9t3d0s2
  11.[ ] c9t4d0s2
  12.[ ] c9t5d0s2
  13.[ ] c9t6d0s2
  14.[ ] c9t7d0s2
  15.[ ] c9t8d0s2
  16.[ ] c9t9d0s2
Enter disk to be mapped to ldoma
```

Figure 33

```
=====================================
||   SunGard Logical Domain Recovery   ||
=====================================
ldm add-vnet pvid=70 id=0 vnet0 primary-vsw0 ldoma
ldm add-vnet pvid=110 id=1 vnet1 primary-vsw0 ldoma
ldm add-vnet pvid=1 id=2 vnet2 primary-vsw1 ldoma
ldm add-vnet pvid=1 id=3 vnet3 primary-vsw2 ldoma
ldm add-vdsdev options=ro /iso/file1.iso file1.iso@primary-vds0
ldm add-vdisk bmrdvd file1.iso.soa-109-ldom@primary-vds0 ldoma
ldm add-vdsdev /dev/dsk/c9t0d0s2 c9t0d0s2@primary-vds0
ldm add-vdisk c9t0d0s2 c9t0d0s2@primary-vds0 ldoma
ldm add-vdsdev /dev/dsk/c9t10d0s2 c9t10d0s2@primary-vds0
ldm add-vdisk c9t10d0s2 c9t10d0s2@primary-vds0 ldoma
ldm add-vdsdev /dev/dsk/c9t11d0s2 c9t11d0s2@primary-vds0
ldm add-vdisk c9t11d0s2 c9t11d0s2@primary-vds0 ldoma
ldm add-vdsdev /dev/dsk/c9t12d0s2 c9t12d0s2@primary-vds0
ldm add-vdisk c9t12d0s2 c9t12d0s2@primary-vds0 ldoma
ldm set-variable auto-boot?=false ldoma
ldm set-variable boot-device=c9t0d0s2 ldoma
```

Figure 34

```
=================================================
||   SunGard Logical Domain Recovery   ||
=================================================

Logical Domain Creation
=================================================

1. [x] Create LDOM Templates based on Production
           * Map LUNs to specific LDOM
           * Map ISO files to specific LDOM 2. Execute LDOM Scripts 0. Go Back or press "Enter" to Main Menu Enter option:
```

Figure 35

```
================================================
||    SunGard Logical Domain Recovery      ||
================================================

Options :
================================================

1. Print LDOM MAC Address Information
         * Essential for identifying NIC and MAC information for BMR Recoveries 2. Print Control Domain Disk mapped to VDS Disk Services and respective LDOMS 3. Build Script for easy remote console access 4. Set System Back to Mfg Defaults
         * WARNING: This will remove all LDOM and Control Domain Information 0. Go Back or press "Enter" to Main Menu Enter option:
```

Figure 36

```
================================================
||    SunGard Logical Domain Recovery      ||
================================================

Select the Backup Interface to print LDOM MAC Addresses:
==================================================================
NIC          VSWITCH           IP_ADDRESS
===          =======           ==========
vsw0         primary-vsw0      172.16.9.3
vsw1         primary-vsw1      10.1.143.99
vsw2         primary-vsw2      10.168.2.24

Select an Interface [vsw2]:

Network Interface: vsw2
==================================================================
LDOM                 Interface          MAC_Address              VLAN
====                 =========          ===========              ====
ldom-a               vnet2              00:14:4f:fa:b5:b6        1
ldom-b               vnet2              00:14:4f:fb:5c:f8        1
ldom-c               vnet2              00:14:4f:fa:2a:24        1
ldom-d               vnet2              00:14:4f:fb:15:b3        1
                     vnet2              00:14:4f:f9:-5:99        1
```

Figure 37

```
Control Domain Configuration for ldmsrv

================================================
||     SunGard Logical Domain Recovery       ||
================================================

Production Disk Mapping to VDS Disk Services

Note: This does not detail all disk configured on the Control Domain,
      only disk mapped to the VDS disk services
 !! This ONLY pertains to PRODUCTION not the current configuration !!
```

| LDOM   | SIZE (GB) | VENDOR  | SERVICE              |
|--------|-----------|---------|----------------------|
| ldom-a | 108.33    | EMC     | vol1@primary-vds0    |
| ldom-a | 55.10     | EMC     | vol2@primary-vds0    |
| ldom-b | 550.00    | HITACHI | ldombvol@primary-vds0 |

Figure 38

```
============================================
||    SunGard Logical Domain Recovery    ||
============================================

This script will automatically open windows for all client ldoms of this control domain The current value is identified as:
vntsd/listen_addr        astring  localhost To enable remote console on this control domain, the following is being done
1. #svccfg
2. svc> select ldoms/vntsd
3. svc> listprop
      Find the entry for "vntsd/listen_addr   astring   localhost"
      This will be changed to "any"
4. svc> setprop vntsd/listen_addr="any"
5. svc> exit
6. #svcadm refresh ldoms/vntsd
7. #svcadm restart ldoms/vntsd If the preceeding steps were not done, the remote console script will not work.
 The current value is now configured for remote console access
vntsd/listen_addr        astring  any The following network addresses exist on this system
127.0.0.1
172.0.190.30
10.130.0.4
10.160.0.5

Which IP address on THIS SERVER will you be accessing the client with?
```

Figure 39

```
Reset System now? [n] y

Stopping ALL LDOMS
LDom ldoma stopped
LDom ldomb stopped

Unbinding LDOM: ldoma
    Removing LDOM: ldoma

Unbinding LDOM: ldomb
    Removing LDOM: ldomb

Removing Configuration: initial

Setting "factory-default" configuration
```

```
                         ATTENTION
 Please reset the factory default configuration from the ILOM
 by doing the following:
================================================================
 -> set /HOST/bootmode config="factory-default"
 -> stop /SYS
 -> start /SYS
```

```
Shutting down system via init 0
```

Figure 40

LOGICAL DOMAIN RECOVERY

BACKGROUND

1. Technical Field

This patent disclosure relates to data processing, and in particular to a managed recovery service that supports orderly recovery of logical domains.

2. Background Information

Virtualization is an approach to data processing that allows multiple operating systems and applications to share the hardware resources of a single host computer. Ideally, virtualization provides resource isolation so that each operating system does not realize that is sharing resources with other operating systems and further such that it cannot adversely affect the execution of the other operating systems. Virtualization is generally recognized as enabling servers, co-located hosting facilities, distributed web services, secure computing platforms and other applications to efficiently use the underlying physical resources.

A virtual machine is a software representation of a data processing machine such as a computer that executes programs in the same manner as a corresponding physical machine. Multiple virtual machines each running their own operating system (called the guest operating system) a frequently used in server consolidation, where different services that in the past had to run on individual physical machines can now instead run in separate VMs on the same physical machine. It is even possible that the guest operating systems do not need to be compliant with the hardware making it possible to run different operating systems on the same physical machine.

In a one common implementation of a virtual environment, a hypervisor is a piece of software, firmware and/or hardware that acts as a virtual machine manager to create and runs different the virtual machines on a given physical host machine. It is also common to use the term logical domain (LDOM) to reference a full virtual machine that runs an independent operating system instance and its virtualized CPU, memory, storage, console, networking, and other resources. These paradigms allow logical grouping of system resources into multiple, discrete systems, each with their own operating system, resources and identity but all within a single physical computer system. For example, a variety of application software can be run simultaneously in different logical domains, all while keeping them independent of performance and security concerns. The use of logical domains can help achieve greater resource usage, and better security.

One of the logical domains, a so-called control domain, is typically run under, or as an integral part of, the hypervisor. The control domain is responsible for creating and manages all other logical domain configurations within a server platform. For example an important task of the control domain is to manage and map the other logical domains serving as guest systems that run the applications.

Virtual data processing resources are now widely available through various data processing providers. Most data processing environments, including virtualized environments, must also tolerate faults of one kind or another. As a result, managed disaster recovery is an increasingly requested offering from the customers of both private and public cloud services. Because the customers of these services typically do not have the expertise to master the technical complexities and compromises of disaster recovery (e.g., minimizing downtime while controlling costs) they look to the service providers for reliable managed recovery options. Managed recovery services can avoid the need for a data center operator to go about rebuilding and restoring their virtual environments on their own.

SUMMARY

While it is one thing for an operator to survey its virtual machines and configurations is quite another to collect and manage all of the details needed to recover a given set of logical domains. Memory and disk allocations, network switch configurations, whether or not virtual local area network tagging is used, etc., are but some of the parameters needed for successful rebuilding to a "hot site" recovery location.

Increasingly, the customers for managed recovery services wish to have control over the configuration of the various data processing elements, including virtual resources allocated to them. They naturally then also seek some level of visibility into any recovery scheme. The problem is that customers of such managed recovery services have no consistent way of rebuilding their virtual infrastructure in the recovery environment, and as a result the vast majority will instead revert to using manual, error-prone processes. At present there is no way to consistently or easily manage recovery of logical domains by users who may not be familiar with the nuances of recovery best practices.

The present invention relates to automating the recovery of logical domain processes to the extent possible but not completely. The approach here is a guided process of building one or more recovery automation scripts to recover the logical domains. The process is guided through a set of menus that capture the logic necessary for orderly recovery, while at the same time permitting the users to specify certain configuration information for the recovered logical domains.

A first step needed before building one or more recovery script(s) is to execute a capture script on the production environment. The capture script retains configuration information for the various logical domains running in the production environment. Based on this output, the recovery script builder then continues to build one or more recovery script(s) capable of rebuilding almost an identical environment in the recovery environment.

To account for unavoidable inconsistencies such as hardware changes between the production and recovery environments, a user interface accepts input from the administrative user to obtain information such as different resource mappings between the two environments. The script builder may further prompts the user to address such changes and remind them to execute certain configuration commands as the scripts are then run.

More specifically, the capture script which is used in the production environment gathers logical domain configuration command output in one or more files. One example command for retrieving configuration information in the Solaris/Oracle environment is an "LDM list constraints" command. These captured output files can then be ideally combined as a single file using formats such as .TAR or .ZIP. The resulting compressed file is then transported to the recovery site in some convenient way via email, electronic file transfer or physical transfer.

Upon initiating a managed recovery process, the configuration files are extracted to the recovery environment. The recover script builder extracts certain information from the file(s) only as necessary to bring up the logical domains, but without extracting information such as application details.

The recovery script builder then offers the administrator via a user interface, which is preferably a text user interface (TUI), to provide further information needed to complete the recovery script(s). The administrator, via this user interface, then provides the further information necessary to complete building of the recovery script.

As part of this process, the administrator can first recover a control domain. Once the control domain is correctly recover, the administrative user can then further specify which virtual guest systems to actually rebuild—this example could include the entire guest system environment as was existed in production, or only a subset.

In a preferred arrangement, the text user interface includes simple menus that direct the user such as via a sequence of numbered steps that can be easily be followed. The recovery processes are thus carried out in an order that is known to encourage successful and rapid recovery of the logical domains in a production environment, including both control and guest system domains.

The recovery script first builds a control and/or service domain of the same type of control domain that was used in the production environment. This control domain will automatically have certain resources allocated to it as an initial step; but the ultimately assigned resources necessary to support the control domain such as storage and networking resources are specified by the user. The system can be made to reboot once the control domain is configured, to limit the amount of resources allocated to the control domain to only that which is needed.

The recovery script builder then continues to analyze the capture files to identify information needed to recover the guest domains, and further based on input provided by the user. A separate shell script creates commands from information pulled from the customer's production environment as well as user input may be created for each guest system. The users input here may include things such as network and storage device mappings—for example the user may specify different names for network interfaces and different types of storage devices in the recovery environment than were used in the production environment.

Some of the attributes of the recovery environment which may be automatically retrieved from the capture script are, for example, the number of virtual machines, and so forth. Example information which may be entered manually may include network interface mappings or storage device mappings.

In one preferred embodiment the recovery automation supports an operating system such as Solaris 10, which is a release of Solaris that supports logical domains and Oracle Virtual Machines. The automation script can be written in any convenient language which can be openly viewed and easily copied or reproduced.

The techniques therefore have particular applicability in an environment where a service provider offers recovery services for virtual data processing resources to numerous commercial customers who might not otherwise be fully cognizant of secondary effects of how the configuration of their infrastructure elements might affect recovery.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3-40 show details of the user interface provided by a recovery script builder process.

DESCRIPTION OF AN ILLUSTRATIVE EMBODIMENT

Figure 1:
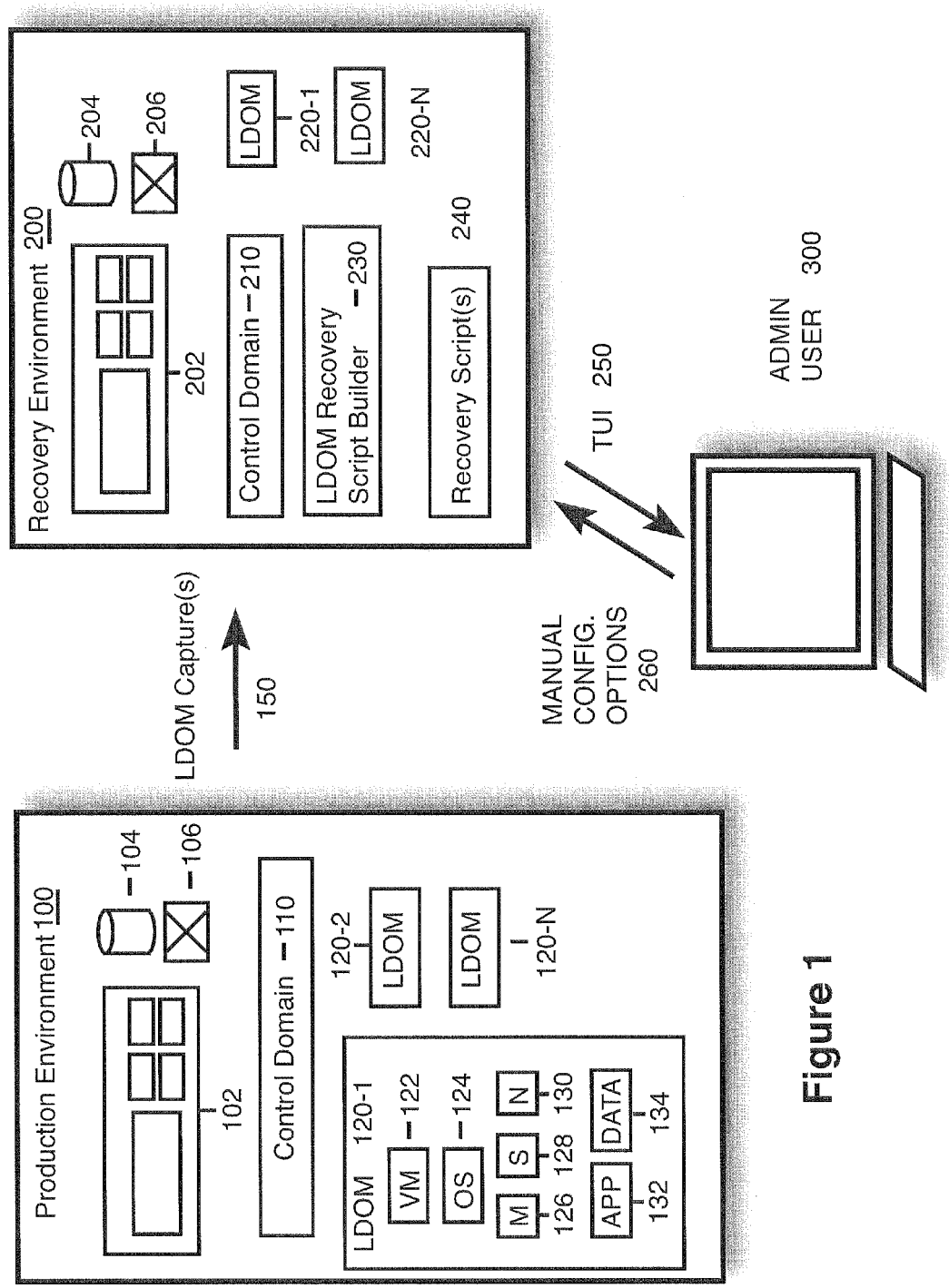
FIG. 1 is a high level diagram of a production environment that has access to a managed recovery service to enable recovery of logical domains to a recovery environment.

FIG. 1 is a high-level diagram of a data processing environment which a logical domain recovery process and system may be implemented. It should be understood that this is but one example environment and many others are possible. The goal is to permit orderly recovery of a production environment 100 in a recovery environment 200. The recovery process and system should operate automatically, to the extent possible, but still provide some level of visibility to an administrative user 300 who can specify certain options to tailor the recovery process according to their needs.

An example production environment 100 consists of one or more physical data processors such one or more physical server(s) 102, which typically will have access to other physical data processing infrastructure such as storage 104 and network devices 106. These infrastructure elements need not be so limited, and may further include elements that are not shown in FIG. 1, such as other types of physical networking equipment such as routers, switches, and firewalls, or other equipment such as load balancers, storage subsystems, and the like. The servers 102 may include web servers, database servers, application servers, storage servers, security appliances or other type of machines. Each server 102 typically includes an operating system, application software, and other data processing services, features, functions, software, and other aspects.

In a preferred arrangement, a production server 102 runs an operating system (OS) that supports virtualization and in particular the OS supports logical domains 120, 120-1, 120-$n$, that may each include virtual machines (VMs) 122. One example of such an operating system is Solaris Version 10, an enterprise class operating system available from Oracle Corporation of Redwood Shores Calif. It should be understood that the production server may be a data processor 102 that the user physically maintains in their own facility or the server 102 may be in the cloud and thus located remotely from the user 300.

With such an operating system an administrative user 300, using tools such as a hypervisor configures each single physical server machine 102 into multiple virtual machines. As a result the hypervisor presents a virtual machine to a number of guest systems, forming a layer between the guest system software running in the virtual machine and the physical hardware. This separation enables the hypervisor to control how the guest operating systems access the hardware resources available within server 102 and via peripherals 104, 106.

In this environment there are two types of domains supported by the hypervisor, a control domain 110 and a guest domain 120. Here we may generally consider the control domain 110 to be an integral part of the hypervisor; the guest domains are referred to herein as logical domains 120. The hypervisor thus assigns one or more virtual CPUs (also referred to as a virtual machines (VMs)) and other virtual data processing resources to each of the control domain and 110 and guest domains 120.

Configured for each such virtual domain is a virtual machine 122, operating system 124, virtual data processing resources such as memory 126, storage 128 and networking 130 as well as other virtual peripheral resources. With allocation of these virtual resources the user can then install application software 132 and application data 134.

The administrative user responsible for ensuring orderly operation of the production environment 100 has also arranged for recovery services, such as by a managed recovery service. The managed recovery service is typically operated by third-party data processing service provider and makes available still further virtual machine resources. These additional virtual machine resources enable the administrative user 300 to replicate their production environment 100 in a recovery environment 200. It becomes desirable therefore to enable orderly replication of all or a subset of the resources configured in the production environment 100 to be instantiated within the recovery environment 200.

Recovery environment 200 thus consists of a virtual or physical server 202 and corresponding virtual or physical peripherals such as storage 204 and networking devices 206. The recovery server 202 typically should also execute the same class of operating system as used in the production system, e.g., an operating system which can support the same type of logical domains as were implemented in the production environment 100.

The goal is further to instantiate a replica control domain 210 that corresponds to the control domain 110 that was running in the production environment 100 as well as one or more of the guest logical domains 120-1, 120-2, . . . , 120-N that were executing in the production environment 100. To this end the recovery environment 200 executes a recovery script builder 230 that builds one or more recovery scripts 240 (or other sets of instructions) that enable the recovery server to construct and bring up a recovery control domain 210 and recovery logical domains 220-1, . . . , 220-M.

As part of this process the recovery script builder 230 runs a user interface which may be a text user interface 250 to obtain certain information consisting of manual configuration options 260 to further assist with recovery script building.

Figure 2:
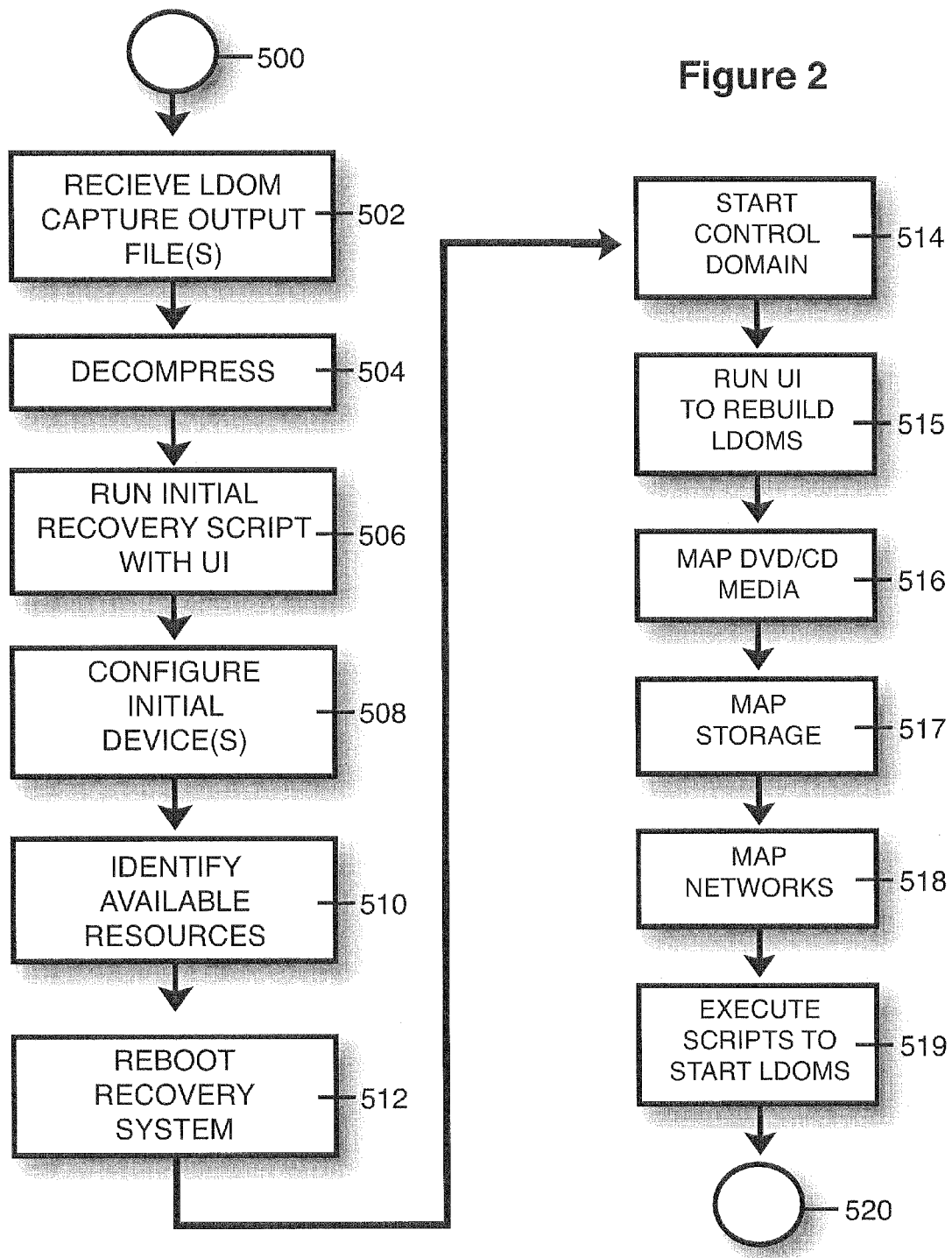
FIG. 2 is a high level process flow diagram for construction of recovery scripts.

To this end a recovery script builder 230 running in recovery environment 200 is executed by the server 202. The recovery script builder 230 generates one or more recovery scripts 240 using the process of FIG. 2. The recovery scripts may be written in a language such as BASH or any other convenient language that can be easily read and modified. Recovery script builder 230 automates some but not all of the process of building these scripts that enable bringing up the replica domains, both the control domains and guest domains, in an orderly fashion. This avoids the need for administrative users 300 to become familiar with recovery processes saving them many hours of recovery environment configuration. The recovery script builder 230 makes use of both information automatically captured from the production environment 100 as well as manual configuration options 260 provided by the administrative user in the process of building these recovery scripts 240.

From an initial state 500 the recovery script builder 230 receives capture output files in state 502. These configuration capture output files 150 (referring back to FIG. 1) capture configuration information concerning the control domain and logical domains 120 running in a production environment 100. The capture files 150 may be generated by capturing the output of shell commands such as a LDM list-constraints command in the Solaris 10/Oracle environment.

Such a command returns a wealth of information regarding not just how the logical domains are configured but also quite a bit more information concerning such as their current operating status. The information returned by such a command may for example include, but may not be limited to, information such as virtual machine configuration, physical CPU resources used, disks, memory, networks, physical input outputs used, peripheral component interconnects, serial channels, active data plane services, operating statistics, data migrations in progress, cryptographic units enabled, host IDs, domain states, application software state, flags, etc. These numerous files, typically at least one file per logical domain, may be therefore preferably received at the recovery system 200 in a compressed form such as via a .TAR or .ZIP file.

It is therefore typically necessary in the next step 504 to not only decompress these files but also to parse them to separate out the unnecessary application related information and status information, and obtain only the essential information needed to initially configure the virtual infrastructure in the recovery environment 200. One example of the type of essential information parsed from the captured output may for example be the number of virtual machines, the type of operating system, the amount of memory, and the storage resources and network connections they are utilizing.

As next step 506 the recovery script builder 230 brings up an initial user interface. This user interface, which may be a simple text user interface, leads the user 300 through a series of steps to initially configure devices to support the recovery of the control domain 210. This may include for example a step 508 of configuring initial resources such as networks from which information such as network interfaces can be retrieved in the recovery environment.

In a next step 510 other virtual resources that may be available in the recovery environment 200 are then identified to the user.

At this point a state 512 is entered in which the recovery system is rebooted.

Once rebooted, the recovery system starts a control domain 210 in state 514. In this state, with the control domain recovered, a state 515 is entered in which another part of the user interface is run. This state 515 will collect additional information so that recovery scripts can be further built to recover the other logical domains, including the guest domains 220.

As an example, state 516 collects mappings for media devices such as DVD/CD drives; state 517 collects mappings for storage devices, and state 519 collects mappings for networks.

Next, state 519 is entered in which the scripts can be executed to start the guest logical domains 220.

Finally, at state 520 the script building and recovery process may end.

Turning attention now to FIGS. 3 through 40, a sequence of typical user interface screens will further demonstrate the recovery script build process in more detail. As shown in FIG. 3 an initial menu is presented when the recovery script builder 230 is first run. Here the menu consists of a sequence of numbered steps for the administrative user 300 to easy follow. As each of the steps are followed their successful completion is confirmed by the administrative user 300 filling in corresponding checkboxes.

As a first step the customer (in the drawings and text that follow the term "customer" also refers to the operator/administrative user 300) is prompted to select option 1 to confirm that he can extract the capture information 150.

In a second step via option 2 on the menu the user 300 is going to identify which media or disk resources are going to be available to retrieve operating system images files for use by the logical domains.

In a third step via option 3 on the menu the administrative user 300 is going to confirm that the control domain has been properly ready in and instituted.

As it will be seen in a fourth step via option 4 the administrative user 300 will confirm that the various logical domains containing the guest systems have been successfully created.

Finally there are other optional steps such as menu option 5 that the user may choose to execute.

FIG. 4 is a detailed view of the user interface when selecting option 1 from the main recovery menu of FIG. 3. Here the user is first asked to confirm or verify that the recovery files that is the .TAR files were properly restored.

Next the user is asked to confirm that the corresponding operating system has been installed in the recovery environment (e.g., Solaris 10) to support the execution of the same type of logical domains as in the production environment. This step is necessary in some instances, because support for logical domains may be an optional feature for such as for the Solaris operating system. Finally the user is asked to confirm that a physical network configuration in the recovery environment is available.

FIG. 5 is an example of a confirmation screen that the user may see as part of the customer file and system package verification process information extracted from the capture file 150 may be summarized as shown for example a production file count logical domain file count control domain counts and confirmation that various services constraints hosts and other configuration information has been found.

As a next step the user presses a command key such as the number zero to return back to the main menu; as shown in FIG. 6, the user can now see the checkbox next to option 1 indicating that the user has completed that first step.

While at the menu in FIG. 6 the user has restored the recovery files and now the next step is to verify any further options necessary to support the logical domain packages are available in the recovery environment 200. Selecting this option may result in a screen such as that shown in FIG. 7, where package verification information is shown. In this example the user is warned such as via the "ATTENTION" note that one aspect of the recovery environment needs attention—namely that a virtual network terminal services daemon is not yet running. A suggestion is made to run the "svcadm enable vntsd" command in order to address this issue. The administrative user (or the script itself will be modified) to arrange for that missing command to be executed on reboot.

The user will then go back and press zero to return to the main menu once again. At this point a screen will be shown such as in FIG. 8 where the user can now check a box to proceed to step 3, to verify network configuration.

On selecting this option a screen such as that shown in FIG. 9 appears providing details of the customer's production network for the control domain while also detailing the network interfaces as they are presently configured on the recovery server. As can be seen there is no corresponding network mapping yet in the recovery server. Further into the managed recovery process the administrator 300 will be able to map the recovery interfaces to the respective production switches and/or interfaces. At this point the user can press zero to return to the previous sub menu which will then appear as in FIG. 10.

Having completed all options on this sub menu the user will return to the menu shown in FIG. 11, now with the first option "customer file and system package verification" completed. The user can then enter item 2 to begin creating a list of available disk devices for use by the logical domains.

As shown in FIG. 12 this step will identify any storage resources such as CD/DVD drives or other any discs already in use by the underlying file systems (i.e. ZFS or UFS running in the Oracle environment). From FIG. 12 can be seen that there is a CD reader and DVD reader already configured as physical devices, and that there are two storage devices are configured as part of an OS pool and is part of an already mounted filesystem. A number of other storage resources such as available Storage Area Network (SAN) resources are available for mapping but not yet mapped.

Continuing at this point returns to the main menu which will now have a state has shown it FIG. 13, with the first and second steps illustrated as being completed. The user selects option 3 from the memu to create the control service domain. Here the user is presented with the menu shown in FIG. 14 to select option 1 to start creating control domain services as they were identified from the production environment.

Next a screen such as that shown in FIG. 15 will be displayed and the control domain will be built based on the information retrieved and parsed from the capture files 150. As the various aspects of the control domain are brought online, these will be confirmed with output to the user interface. Any initial build of control file commands are listed.

At this point the user can select an option to return to the previous menu which will show as in FIG. 16 when the user can now select option 2 to enable him to map network configurations. The next screen shown in FIG. 17 allows the user to map production network interfaces to those in the recovery environment. The user is presented with a list of production network interfaces as retrieved from the capture files 150 and available recovery network interfaces supplied by the recovery environment 200. The user can then interact with the menu in FIG. 17 to ultimately end up with a screen such as that shown in FIG. 18 in which the network devices are mapped.

As network devices are mapped they are removed from the list of available devices to be selected. In this particular example the user is not concerned with reconfiguring a virtual switch the same way it was in the production environment, and thus is simply mapping to any available network interfaces in the recovery environment. Finally in the state is reached as in FIG. 20 where all of the network mappings have been made and the user can now return to the previous menu as shown in FIG. 21.

Note here that since option 1 and 2 are already checked option 3 will remain visible so that the administrator can control when to assemble the control domain script. Once option 3 is checked, a control domain recovery script 240 is built. An option then appears for the administrator user 300 to actually execute the newly created script. In choosing option 4 from the menu in FIG. 21 the system will apply configuration, enabled the "vntsd" service as previously informed, reboot the recovery system(s), and bring up the control domain.

A confirmation screen such as that shown in FIG. 22 is shown to the user as the control domain recovery script is built. FIG. 23 is the interface screen that prompts for executing the control domain script and rebooting the recovery system once the user selects to actually reboot the system. As shown in FIG. 24 the control domain script is executed and confirmation of the same is evident to the user as shown by the screen in FIG. 25. The user is also reminded as shown at the bottom of FIG. 25 that they must enable the certain service has previously warned upon reboot.

As shown in FIG. 26 the user will see a reboot screen and that in this instance the amount of memory that has been allocated to the control domain in the rebooted recovery server 202 has been reduced for example, from an original total memory of 120 GB, to the control domain now being limited to using 15 GB as per the corresponding control domain 110 in the production environment.

After reboot the user is presented with the menu in FIG. 27 where the user will restart the recovery script builder 232. Here having already completed options 1 through, the user can now proceed to create the scripts necessary to reconstruct the other logical domains that is, the guest domains, in option 4.

From there the user then sees the screen in FIG. 28 where they can select option 1 to create the logical domain templates for the guest systems based on the information retrieved from the production environment. They are also informed here that they will be expected to map the logical unit numbers (LUNS) of storage devices and map .ISO's for the corresponding operating system image files to specific logical domain resources.

So for example a screen is reached such as that shown in FIG. 29 with a user being asked to enter a path for the .ISO files that will be mapped to the logical domains. In this example the user's initial entry resulted in an error and they were prompted to specify a different directory.

Once the .ISO files are found a screen shown in FIG. 30 is displayed listing the available logical domains to be recovered. In this example the user is selecting only two of the logical domains (logical domain A and logical domain B) to be recovered and that logical domain C will not be recovered.

The recovering process continues with a screen as in FIG. 31 by mapping an .ISO file to the logical domain being configured. Once this is done the recovery script builder will start assembly of the script for that logical domain based on the production output and the user inputs. The user interface screen here may enable the user to confirm available disks such as may be provided in the recovery environment via a storage area network. The available disks within the service are then mapped to also allow for an Open Boot Prompt (OBP) alias name for each.

A screen such as that shown in FIG. 32 is then shown and any appropriate further "ldm" configuration commands are executed as shown, making virtual disk resources available to the logical domain. Here the user is again warned that after reboot they should ensure that a particular necessary service is enabled.

From the next screen shown in FIG. 33 the user selects which logical unit numbers (LUNS) will be mapped to the logical domain being configured. The user should account for the operating system disk in addition to any storage required for restored data file systems. At this time the user should also know the LUN sizes.

Once that is selected the user continues with the next menu and a screen shown as in FIG. 34 will be displayed, where the server then combines all necessary commands with a single script for the logical domain being recovered.

The process then repeats itself for each logical domain selected for recovery. A separate script file for each individual logical domain to be recovered may be generated as one of the script files 240.

Reaching the menu shown in FIG. 35 the user has finalized the recovery configuration and generated all needed script files. The user can select an option to then execute the script files and bring up all of the logical domains. Optionally, if the user wishes to, they may only execute certain ones of the scripts individually.

Once step 2 is executed from FIG. 35 all of the logical domains to be recovered, including the control domain and guest domains, should now be configured and operational.

FIG. 36 is an example of some of the additional options can be arrived at from option 5 on the main men. These can include printing MAC layer address information (which can be essential for identifying network address information for Bare Metal Restore (BMR) recovery processes), to print disk mappings for various disk services, to build scripts for console access, and to return recovery systems back to manufacturer defaults.

FIG. 37 is an example of the screen when the user selects to print the MAC addresses assigned to the logical domains. This can be useful to access during network troubleshooting, when doing network installs to the logical domains, or performing a restoration via a bare metal restore process.

FIG. 38 is an example screen reached from option 2 which displays or prints the users disk allocations as they are in production environment. This mapping details both the virtual disk services as well as the logical domains they are assigned to.

From FIG. 39 it is possible to enable remote console access on the control domain. This screen shows the user what is being done and towards the bottom the user is enabled to select one of the IP network addresses to be used for access to the particular server console.

Finally FIG. 40 is an example screen the user may reach when they select an option to reset the system after such as after a test or after a disaster. This menu will stop, unbind, and remove all logical domains configured on the recovery system. Upon shutdown or when prompted the user may set the system back to factory default configurations.

Implementation Options

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method for recovering a production environment which includes one or more virtual data processing infrastructure elements that together comprise one or more logical domains, and where a recovery environment provides a managed recovery service for the virtual infrastructure elements, the method carried out in the recovery environment, comprising:
   a. receiving one or more data files containing configuration information for the virtual infrastructure elements comprising one or more logical domains exported from the production environment;
   b. instantiating a recovery system for hosting at least one logical domain of the same type as at least one logical domain as in the production environment;
   c. configuring one or more local storage devices for the recovery system;
   d. configuring one or more network interfaces for the recovery system;
   e. executing a user interface within the recovery system to confirm information for a recovery script including;
      i. data files containing the configuration information are available to the recovery system;
      ii. one or more storage devices are available for use by the logical domain in the recovery system;
      iii. a mapping of storage devices reported in the production system to storage devices configured for the recovery system;
      iv. a mapping of network interfaces reported in the production system to network interfaces configured for the recovery system;
   f. assembling a recovery script for the control domain from both the data files containing the configuration information and from inputs provided to the user interface, such that only a subset of the logical domains in the production environment are selected via the user interface to be instantiated in the recovery environment; and
   g. executing the recovery script with the recovery system to recover only the subset of logical domains.

2. The method of claim 1 further comprising before the step of executing the recovery script:
   executing a control domain script within the recovery system;
   rebooting the recovery system for instantiating a control domain; and
   executing the user interface within the control domain to confirm:
      creating of one or more virtual guest logical domains within the recovery system that correspond to the subject of logical domains in the production system.

3. The method of claim 2 wherein after rebooting, the recovery system makes available fewer resources to the control domain than were available before the rebooting step.

4. The method of claim 2 wherein the logical domain further comprises a hypervisor under which the control domain and underlying virtual guest logical domains execute.

5. The method of claim 1 wherein the infrastructure elements include one or more virtualized central processors, memory, storage, console, networking, or other data processing devices.

6. The method of claim 2 wherein the data files containing configuration information are generated by redirecting output from a series of logical domain query commands executed in the production environment.

7. The method of claim 6 further comprising:
   decompressing the data files containing the configuration information prior to instantiating the control domain.

8. The method of claim 1 wherein the step of mapping production system storage devices to recovery system storage devices comprises accepting user input selecting available local or storage area network storage.

9. The method of claim 1 wherein the step of mapping production system network interfaces to recovery system network interfaces comprises accepting user input selecting available virtual network switch interfaces.

10. A managed recovery system for managing recovery of logical domains in a virtualized data processing production environment comprising:
- a storage device for storing one or more data files containing configuration information for the virtual infrastructure elements exported from the production environment:
- a storage device for storing one or more data files containing configuration information for the virtual infrastructure elements exported from the production environment:
- a recovery data processing system comprising a processor, local storage devices, and network interfaces, for
   a. hosting at least one logical domain of the same type of logical domain as in the production environment;
   b. configuring one or more local storage devices for the recovery system;
   c. configuring one or more network interfaces for the recovery system;
   d. obtaining user input to confirm:
      i. the data files containing the configuration information are available to the recovery system;
      ii. One or more of the local storage devices are available for use by the logical domain in the recovery system;
      iii. a mapping of storage devices reported in the production system data to storage devices in the production system;
      iv. a mapping of network interfaces reported in the production system to network interfaces configured in the recovery system; and
   generating a recovery script from both the data files containing the configuration information and from inputs provided to the user interface, such that only a subset of the logical domains in the production environment are selected to be instantiated in the recovery environment; and
   f. generating a control domain script within the recovery system.

11. The system of claim 10 further wherein the recovery system is further for:
   f. executing the control domain script;
   g. responding to a user input to reboot; and
   h. after rebooting, executing the user interface within the control domain to receive user input confirming:
      v. creation of one or more virtual guest domains within the recovery system that correspond to the subset of logical domains in the production system.

12. The system of claim 11 wherein, after rebooting, the recovery system makes available fewer resources to the control domain than were available before the rebooting.

13. The system of claim 11 wherein the logical domain further comprises a hypervisor for executing the control domain and underlying virtual guest system domains.

14. The system of claim 10 wherein the infrastructure elements include one or more virtualized central processors, memory, storage, console, networking, or other data processing devices.

15. The system of claim 10 wherein the data files containing configuration information comprise redirected output from a series of logical domain query commands executed in the production environment.

16. The system of claim 15 wherein the recovery system is further for:
   decompressing data files containing the configuration information prior to instantiating the recovery system.

17. The system of claim 10 wherein the user input comprises selecting available local or storage area network storage.

18. The system of claim 10 wherein user input comprises selecting available virtual network switch interfaces.

19. The method of claim 1 additionally comprising:
   parsing the data files to extract information concerning storage devices and network interfaces comprising logical domains in the production environment.

20. The system of claim 10 wherein the recovery data processing system further:
   Parses the configuration information to extract information concerning storage devices and network interfaces comprising logical domains in the production environment.

* * * * *

UNITED STATES PATENT AND TRADEMARK OFFICE
CERTIFICATE OF CORRECTION

| | | |
|---|---|---|
| PATENT NO. | : 9,047,248 B2 | Page 1 of 1 |
| APPLICATION NO. | : 13/752835 | |
| DATED | : June 2, 2015 | |
| INVENTOR(S) | : Edward A. Crabtree, Jr. | |

It is certified that error appears in the above-identified patent and that said Letters Patent is hereby corrected as shown below:

In the Claims:

Claim 2, Col. 12, line 46 should read as following:
subset of logical domains in the production system.

Starting with Claim 10, Col. 13, line 12 and ending with Claim 10, Col. 13, line 15; delete paragraph:
"~~a storage device for storing one or more data files containing configuration information for the virtual infrastructure elements exported from the production environment;~~"

Signed and Sealed this
Sixth Day of October, 2015

Michelle K. Lee
*Director of the United States Patent and Trademark Office*